(12) United States Patent
Potter et al.

(10) Patent No.: US 10,647,309 B2
(45) Date of Patent: May 12, 2020

(54) QUICK SERVICE LIMITING VALVE

(71) Applicant: Westinghouse Air Brake Technologies Corporation, Wilmerding, PA (US)

(72) Inventors: William John Potter, Trafford, PA (US); Ryan Repko, Delmont, PA (US); Edward W. Gaughan, Greensburg, PA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 0 days.

(21) Appl. No.: 16/202,750

(22) Filed: Nov. 28, 2018

(65) Prior Publication Data

US 2019/0176791 A1 Jun. 13, 2019

Related U.S. Application Data

(60) Provisional application No. 62/596,280, filed on Dec. 8, 2017.

(51) Int. Cl.
| | |
|---|---|
| *F16K 15/02* | (2006.01) |
| *B60T 15/02* | (2006.01) |
| *B60T 15/42* | (2006.01) |
| *B60T 17/22* | (2006.01) |

(52) U.S. Cl.
CPC ............ *B60T 15/024* (2013.01); *B60T 15/42* (2013.01); *B60T 17/228* (2013.01); *F16K 15/026* (2013.01)

(58) Field of Classification Search
CPC ...... B60T 15/024; B60T 15/42; B60T 17/228; F16K 15/026
See application file for complete search history.

(56) References Cited

U.S. PATENT DOCUMENTS

| | | | |
|---|---|---|---|
| 2,992,861 | A | 7/1961 | Hursen |
| 3,279,867 | A | 10/1966 | Bueler |
| 3,731,983 | A | 5/1973 | Washboum |
| 3,832,015 | A | 8/1974 | Beck et al. |
| 3,994,536 | A | 11/1976 | Prada |
| 4,025,126 | A | 5/1977 | Wilson |
| 4,063,784 | A | 12/1977 | Pick |
| 4,125,294 | A | 11/1978 | Cannon |
| 4,161,340 | A | 7/1979 | Hart |
| 4,230,377 | A | 10/1980 | Goebels |
| 4,339,155 | A | 7/1982 | Hart |

(Continued)

*Primary Examiner* — P. Macade Nichols
(74) *Attorney, Agent, or Firm* — Christopher R. Carroll; The Small Patent Law Group LLC

(57) ABSTRACT

A quick service limiting valve includes a housing defining an interior chamber, a brake pipe passageway, and a brake cylinder passageway, a valve member received within the interior chamber of the housing, with the valve member including a body, a first seal, a second seal, and a valve spring. The body of the valve member defines a valve passageway, with the valve member having a first position where the valve passageway allows fluid communication between the brake pipe passageway and the brake cylinder passageway and a second position where the brake pipe passageway is isolated from the brake cylinder passageway. The valve further includes a follower assembly received within the interior chamber of the housing, with the follower assembly including a body, a first check valve, a second check valve, a diaphragm, and a follower spring.

20 Claims, 6 Drawing Sheets

(56) References Cited

U.S. PATENT DOCUMENTS

| | | | |
|---|---|---|---|
| 4,405,182 A | 9/1983 | Hart | |
| 4,453,779 A | 6/1984 | Bridigum | |
| 4,474,412 A | 10/1984 | Schmitt | |
| 4,478,460 A | 10/1984 | Wickham | |
| 4,678,241 A | 7/1987 | Tamamori et al. | |
| 5,044,698 A | 9/1991 | Hart et al. | |
| 5,213,397 A | 5/1993 | Troiani | |
| 5,326,159 A | 7/1994 | Hart et al. | |
| 5,387,030 A | 2/1995 | Gayfer et al. | |
| 5,429,426 A | 7/1995 | Hart | |
| 5,564,794 A | 10/1996 | Hart | |
| 5,918,634 A * | 7/1999 | Hart | B60T 13/665 137/624.11 |
| 6,126,245 A | 10/2000 | Barber et al. | |
| 6,769,744 B2 | 8/2004 | Marsh et al. | |
| 7,077,481 B2 | 7/2006 | Marsh et al. | |
| 9,266,516 B2 | 2/2016 | Call et al. | |
| 9,505,391 B2 | 11/2016 | Connell et al. | |
| 9,527,491 B2 | 12/2016 | Wright et al. | |
| 10,179,580 B2 | 1/2019 | Call et al. | |
| 2018/0257626 A1* | 9/2018 | Gaughan | B61H 13/00 |

* cited by examiner

QUICK SERVICE LIMITING VALVE

CROSS-REFERENCE TO RELATED APPLICATION

This application claims priority to U.S. Provisional Application Ser. No. 62/596,280, filed Dec. 8, 2017, which is hereby incorporated by reference in its entirety.

BACKGROUND OF THE INVENTION

Field of the Invention

The present invention generally relates to brake apparatus for railway vehicles and, more particularly, to a valve for maintaining brake cylinder pressure for all service brake applications.

Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves to control the operation of the brake cylinders and brakes for the freight cars, such as the ABDX control valve sold and manufactured by Wabtec Corporation.

When a train brake pipe is fully charged to the pressure setting of the locomotive brake valve device, a natural pressure gradient typically exists in the brake pipe due to leakage caused by wear and other issues resulting in pressure changes with the brake cylinders. Assuming the locomotive brake valve is set to charge the brake pipe to 90 psi, the pressure at each car from the front to the rear of the train will experience a slightly lower pressure due to leakage and fluid flow resistance as the pressure maintaining brake valve attempts to maintain the leakage. The brake pipe pressure will gradually rise from front to back in seeking the natural pressure gradient consistent with the application of brake pipe pressure at the locomotive.

Current brake systems for railway vehicles may also experience leakage of pressurized fluid into or out of the brake cylinder of the brake system. The Association of American Railroads' specification for a single railway car specifies allowable leakage into/out of the brake cylinder at the rate of +/−1 psi/min. At this rate, acceptable loss of brake cylinder pressure is permitted while still safely maintaining brake cylinder pressure levels for the operation of the railway vehicle's brake system. When operating a railway vehicle on a grade for an extended period of time, however, a minimal level of leakage out of the brake cylinder in one minute can decrease to a low enough pressure to result in reduced braking effort.

SUMMARY OF THE INVENTION

In one aspect, a quick service limiting valve includes a housing defining an interior chamber, a brake pipe passageway, and a brake cylinder passageway, a valve member received within the interior chamber of the housing, with the valve member including a body, a first seal, a second seal, and a valve spring. The body of the valve member defines a valve passageway, with the valve member having a first position where the valve passageway allows fluid communication between the brake pipe passageway and the brake cylinder passageway and a second position where the brake pipe passageway is isolated from the brake cylinder passageway. The valve spring biases the valve member to the second position. The quick service limiting valve also includes a follower assembly received within the interior chamber of the housing, with the follower assembly including a body, a first check valve, a second check valve, a diaphragm, and a follower spring, with the diaphragm having a first side in fluid communication with the brake cylinder passageway and a second side in fluid communication with a reference chamber. The first check valve has a first position where the brake cylinder passage is in fluid communication with the reference chamber and a second position where the brake cylinder passage is isolated from the reference chamber. The second check valve has a first position where the reference chamber is in fluid communication with the brake cylinder passageway and a second position where the reference chamber is isolated from the brake cylinder passageway. The follower spring biases the valve member toward the first position. The valve member is configured to move between the first position and the second position based on a pressure differential between a pressure of the brake cylinder passage and a pressure of the reference chamber.

The first check valve may be a one-way check valve only allowing air flow into the reference chamber. The first check valve may include a check body and a check spring, the check spring biasing the first check valve to the second position into engagement with a seat defined by the body of the follower.

The second check valve may be a one-way check valve only allowing air flow from the reference volume to the brake cylinder passageway. The second check valve may be an umbrella valve.

The valve member may further include a backflow check valve configured to prevent flow from the brake cylinder passageway to the brake pipe passageway. The backflow check valve may be received within the valve passageway of the valve member, with the back flow check valve including a spring seat, backflow spring, and a valve member. The valve member of the backflow check valve may be spherical.

The follower assembly may include a choke positioned between the brake cylinder passageway and the first check valve. The choke may include a filter.

The housing and the second side of the diaphragm may define the reference chamber.

The first and second seals of the valve member may form a seal between the housing and the first and second seals. The first and second seals may be O-rings. The first and second seals may be secured to the valve member. The valve passageway of the valve member may include a central opening extending along a longitudinal axis of the body of the valve member and a first through hole extending in a radial direction relative to the longitudinal axis of the body of the valve member. The valve passageway of the valve member may further include a second through hole extending in a radial direction relative to the longitudinal axis of the body of the valve member, with the second through hole axially spaced from the first through hole. The first through hole of the valve passageway of the valve member may be positioned between the first and second seals. An opening of the brake pipe passageway may be positioned between the first and second seals when the valve member is in the first position. The first and second through holes of the valve passageway may be configured to form a choke to restrict flow from the brake pipe passageway to the brake cylinder passageway when the valve member is in the first position.

The body of the follower assembly may be secured to the diaphragm, and the body of the follower assembly may engage the valve member.

DETAILED DESCRIPTION

Figure 1:
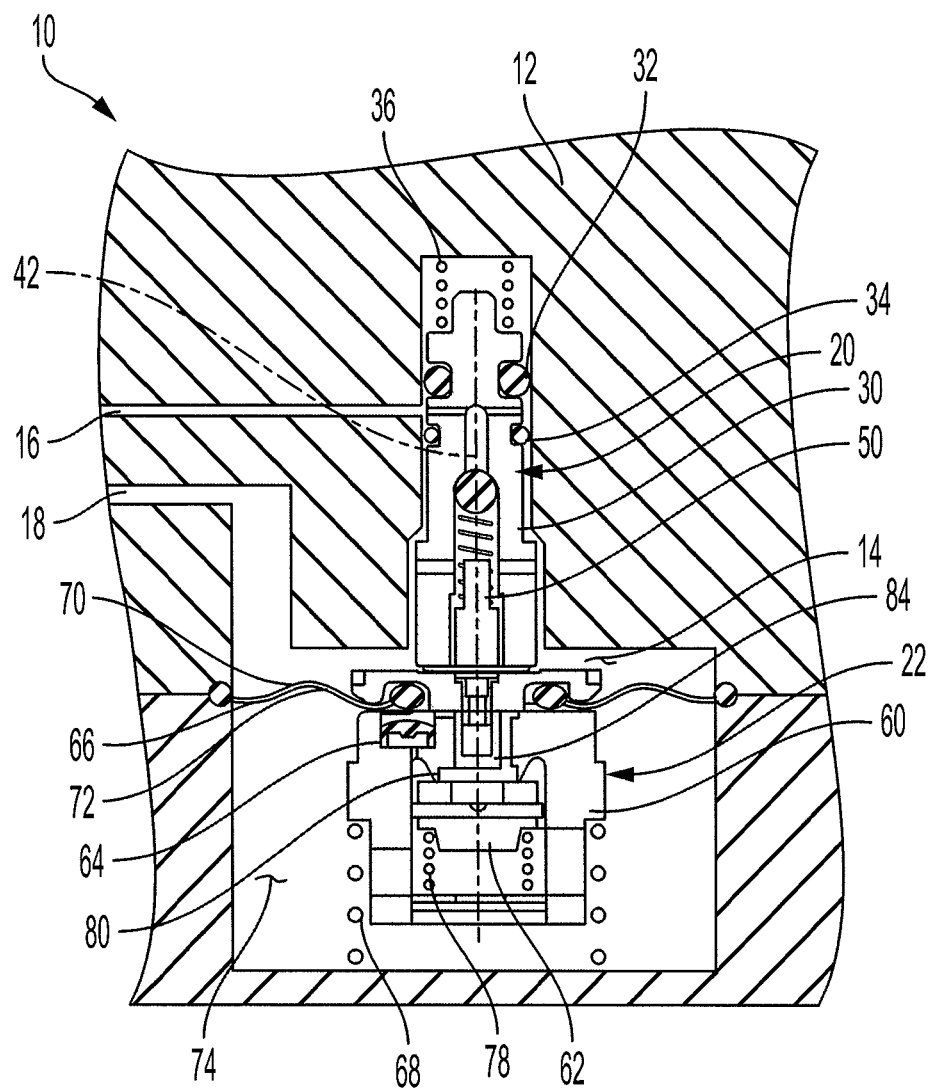
FIG. 1 is a cross-sectional view of a quick service limiting valve according to one aspect of the present invention, showing a first position of the valve.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

There are two types of demand on brake pipe pressure: continuous and temporary. Continuous leakage exists in the train line regardless of release or applied status of the brake cylinder. Temporary demand occurs on the brake pipe during a brake application with control valves applying temporary demand on the brake pipe to augment the service brake application signal transmission. Continuous demand on brake pipe creates a continuous flow into the train brake system to maintain brake pipe pressure. Continuous demand results in a pressure gradient from the front to the rear of a train. Temporary demand on brake pipe allows the manipulation of brake pipe at each car to develop cylinder pressure in a timely fashion. Typical freight control valves incorporate three distinct manipulations of brake pipe pressure, which are temporary. Temporary demands on brake pipe include: Preliminary Quick Service; Quick Service Limiting Valve (QSLV); and Accelerated Application Valve (AAV).

Preliminary Quick Service directs brake pipe pressure to a volume (quick service bulb) and is vented to atmosphere at the beginning of a brake application. This connection provides a local drop of brake pipe at each car to enhance the transmission of the brake pipe pressure reduction through the train. The Preliminary Quick Service isolates the brake pipe connection when the service piston moves into the service application position thereby directing auxiliary reservoir to brake cylinder. This demand on brake pipe is temporary.

A conventional QSLV directs brake pipe pressure to brake cylinder when a brake application is made. When a brake application is made, the main piston directs auxiliary reservoir to brake cylinder and the QSLV directs brake pipe to brake cylinder. When brake cylinder reaches approximately 10 psi, the QSLV isolates brake pipe from brake cylinder. This demand on brake pipe is temporary. The QSLV, by FRA and AAR regulations, must produce 8 to 12-psi brake cylinder pressure for a 5-psi brake pipe reduction. During a brake application, a conventional QSLV will reopen the connection between the brake pipe and brake cylinder in the event there is a loss of brake cylinder pressure that causes brake cylinder pressure to fall below 10 psi. A conventional QSLV, however, will not maintain brake cylinder pressure based on the targeted cylinder pressure. For example, during a 20 psi brake cylinder application, a conventional QSLV will not maintain brake cylinder within certain range, such as +/−2 psi, of the initial 20 psi target pressure.

Referring to FIGS. 1-8, according to one aspect of the present invention, a quick service limiting valve 10 is provided that maintains a target pressure within a brake cylinder during a brake application. The quick service limiting valve 10 includes a housing 12 defining an interior chamber 14, a brake pipe passageway 16, and a brake cylinder passageway 18, a valve member 20 received within the interior chamber 14 of the housing 12, and a follower assembly 22 received within the interior chamber 14 of the housing 12. The brake pipe passageway 16 is configured to be in fluid communication with a brake pipe (not shown). The brake cylinder passageway 18 is configured to be in fluid communication with a brake cylinder (not shown). The quick service limiting valve 10 may be provided integrally with a control valve, such as an ABDX® control valve from Wabtec Corporation, although the quick service limiting valve 10 may also be provided as a separate component.

Referring to FIGS. 1, 2, and 6-8, the valve member 20 includes a body 30, a first seal 32, a second seal 34, and a valve spring 36. The body 30 of the valve member 20 has a first end 38 and a second end 40 and defines a valve passageway 42. The valve passageway 42 has a first through hole 44 and a second through hole 46 in fluid communication with a central opening 48. The first and second through holes 44, 46 may be formed perpendicular to the central opening 48. The first and second through holes 44, 46 are positioned intermediate the first and second ends 38, 40 of the body 30 of the valve member 20. The first seal 32 and the second seal 34 may be O-rings, although other suitable seals may be utilized. The valve spring 36 may be a compression spring, although other suitable springs or biasing arrangements may be utilized. The valve member 20 has a first position (FIG. 1) where the valve passageway 42 allows fluid communication between the brake pipe passageway 16 and the brake cylinder passageway 18 and a second position (FIG. 2) where the brake pipe passageway 16 is isolated from the brake cylinder passageway 18. The valve spring 36 biases the valve member 20 to the second position. The valve member 20 also includes a backflow check valve 50 configured to prevent flow from the brake cylinder passageway 18 to the brake pipe 16. The backflow check valve 50 is received within the valve passageway 42 of the valve member 20 and includes a spring seat 52, a backflow spring 54, and a valve member 56. The backflow check valve 50 is a ball check valve, although other suitable valve arrangements may be utilized.

Referring to FIGS. 1-5, the follower assembly 22 includes a body 60, a first check valve 62, a second check valve 64, a diaphragm 66, and a follower spring 68. The follower spring 68 may be a compression spring, although other suitable springs or biasing arrangements may be utilized. The diaphragm 66 has a first side 70 in fluid communication with the brake cylinder passageway 18 and a second side 72 in fluid communication with a reference chamber 74. The reference chamber 74 is defined within the interior chamber 14 of the housing 12 by the diaphragm 66 and the housing 12. The first check valve 62 has a first position where the brake cylinder passageway 18 is in fluid communication with the reference chamber 74 and a second position where the brake cylinder passageway 18 is isolated from the reference chamber 74. The second check valve 64 has a first position where the reference chamber 74 is in fluid communication with the brake cylinder passageway 18 and a second position where the reference chamber 74 is isolated from the brake cylinder passageway 18. The follower spring 68 biases the valve member 20 toward the first position. As discussed in more detail below, the valve member 20 is configured to move between the first position (FIG. 1) and the second position (FIG. 2) based on a pressure differential between a pressure of the brake cylinder passageway 18 and a pressure of the reference chamber 74 combined with the follower spring 68.

Referring again to FIGS. 1-5, the first check valve 62 is a one-way check valve that only allows air flow into the reference chamber 74. The first check valve 62 includes a check body 76 and a check spring 78. The check spring 78 biases the first check valve 62 to the second position into engagement with a seat 80 defined by the body 30 of the follower assembly 22. The check spring 78 may be secured within the body 30 of the follower assembly 22 by a retaining ring 82. The second check valve 64 is a one-way check valve that only allows air flow from the reference chamber 74 to the brake cylinder passageway 18. The second check valve 64 is an umbrella valve, although other suitable valve arrangements may be utilized. The follower assembly 22 also includes a choke 84 positioned between the brake cylinder passageway 18 and the first check valve 62. The choke 84 is received by the body 30 of the follower assembly 22. Further, the choke 84 includes a filter 86 configured to prevent any debris from preventing flow through the choke 84. As discussed in more detail below, the choke 84 is configured to restrict the flow of air to the reference chamber 74 to prevent an erroneously high target pressure from being directed to the reference chamber 74. When the second check valve 64 is in the first position, air may flow from the reference chamber 74, through an exhaust opening 88 defined by the body 30 of the follower assembly 22, through the second check valve 64, through an exhaust passageway 90 in the body 30 of the follower assembly 22, through the choke 84, and into the brake cylinder passageway 18.

Figure 2:
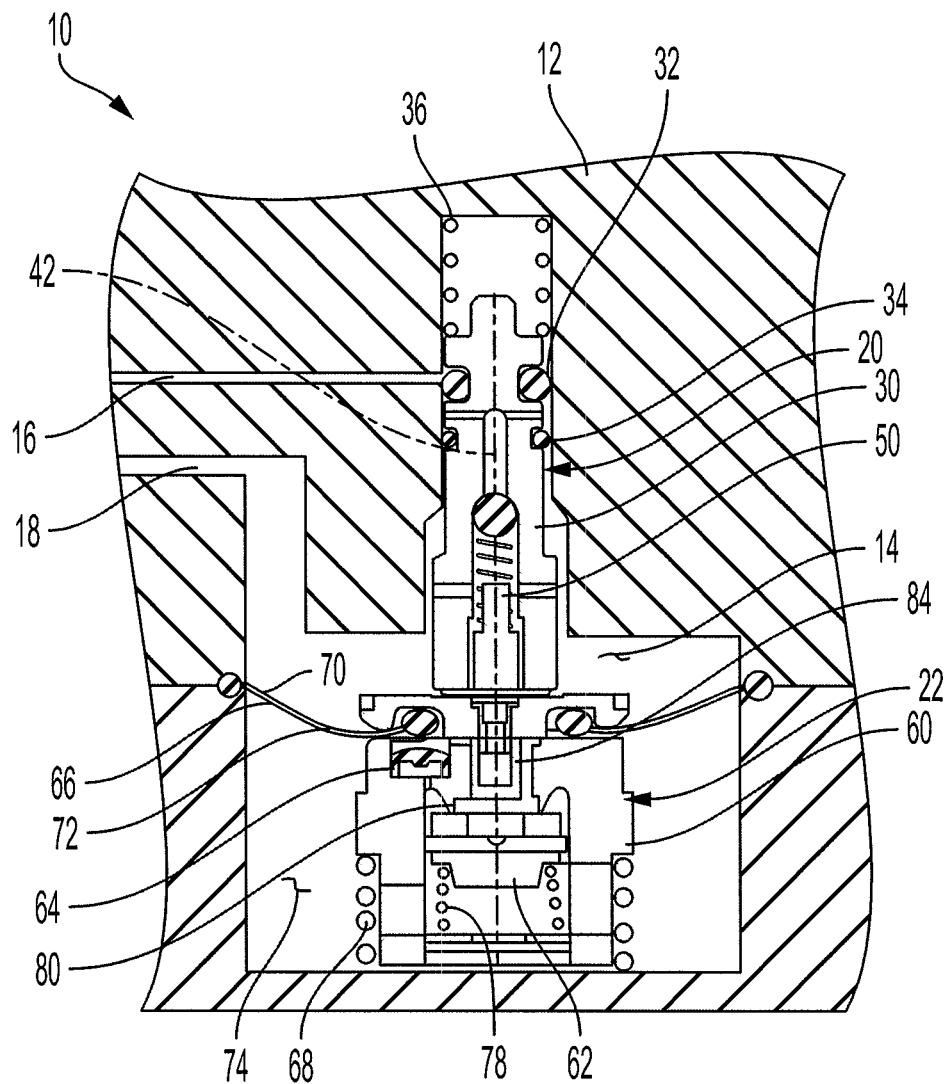
FIG. 2 is a cross-sectional view of the valve of FIG. 1, showing a second position of the valve.
Figure 3:
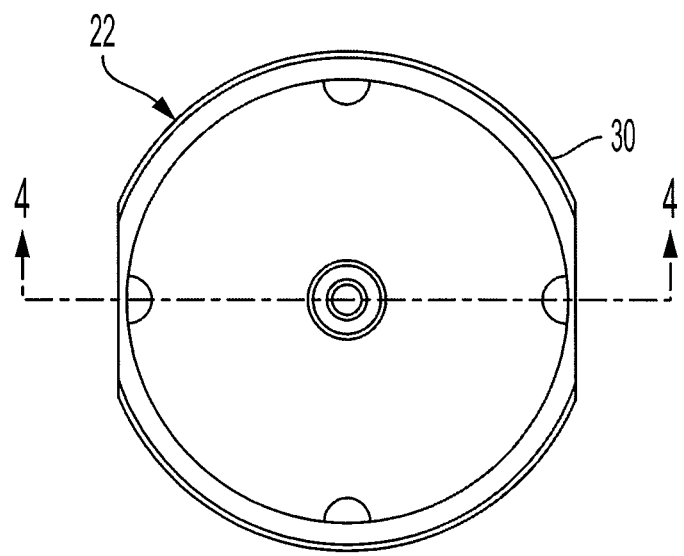
FIG. 3 is a top view of a follower assembly according to one aspect of the present invention.
Figure 4:
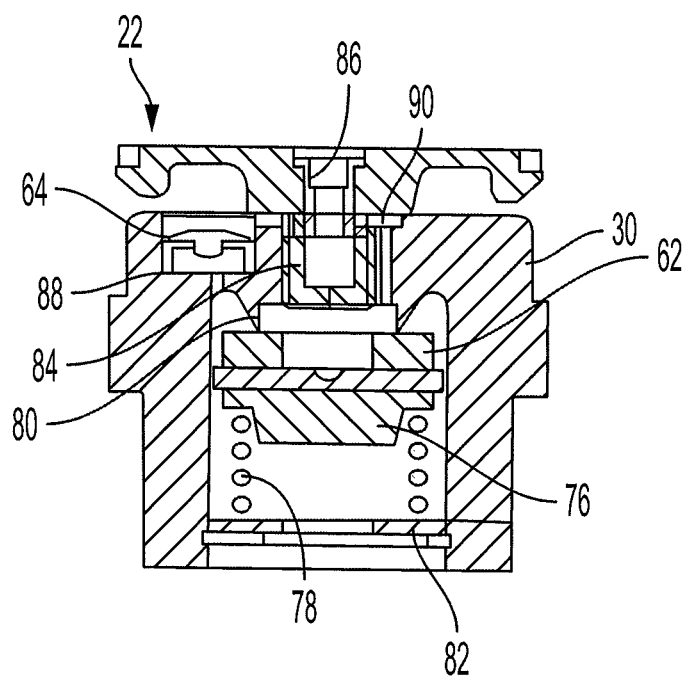
FIG. 4 is a cross-sectional view along line A-A shown in FIG. 3.
Figure 5:
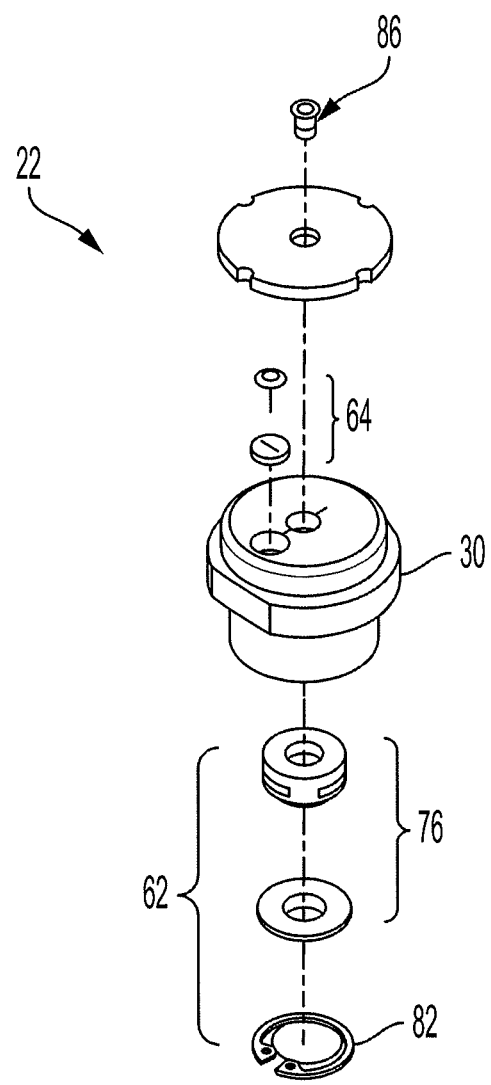
FIG. 5 is an exploded perspective view of the follower assembly of FIG. 3.
Figure 6:
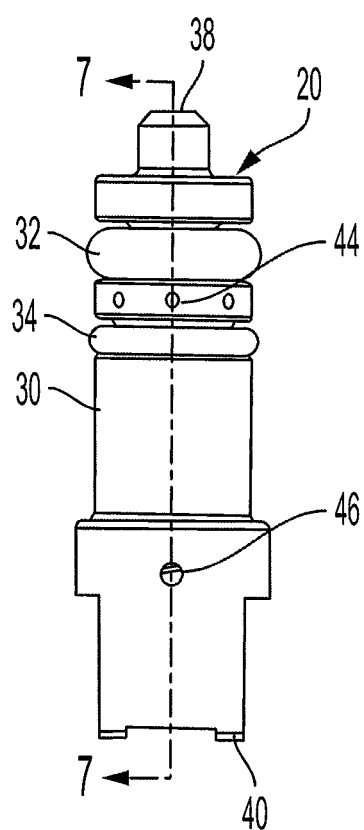
FIG. 6 is a front view of a stem valve assembly according to one aspect of the present invention.
Figure 7:
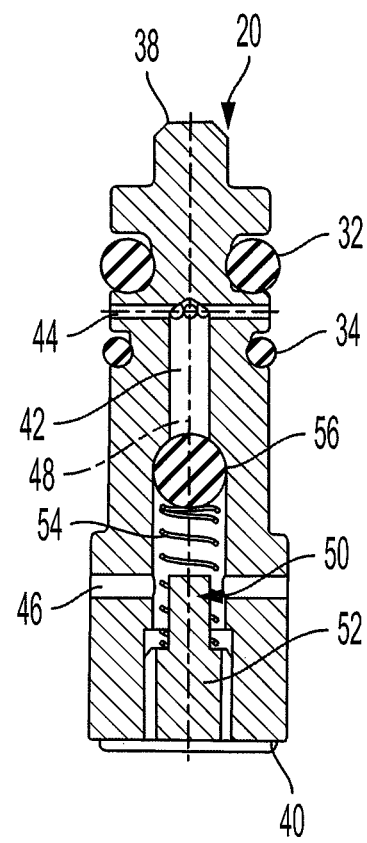
FIG. 7 is a cross-sectional view along line A-A shown in FIG. 6.
Figure 8:
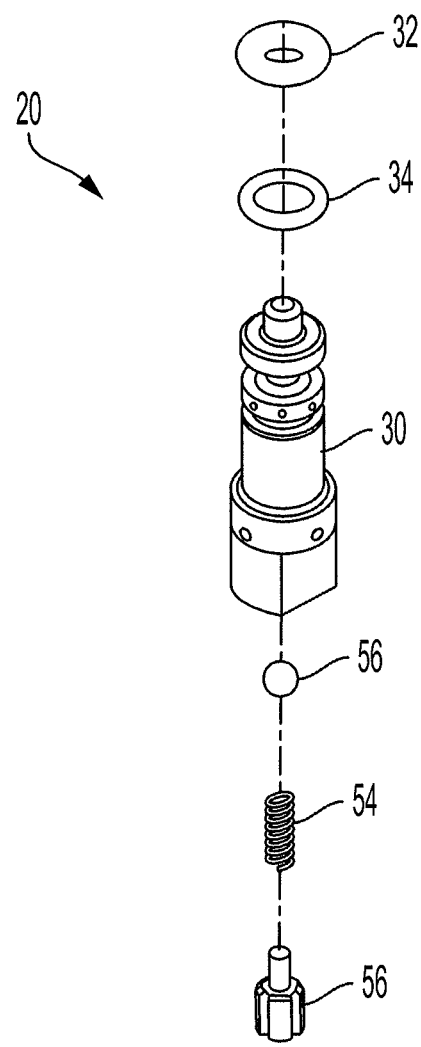
FIG. 8 is an exploded perspective view of the stem valve assembly of FIG. 6.

Referring to FIGS. 1 and 2, during a brake application, brake cylinder pressure enters the interior chamber 14 of the housing 12 via the brake cylinder passageway 18, flows through the filter 86 and the choke 84 and moves the first check valve 62 from the second position to the first position by unseating the check body 76 from the seat 80. With the first check valve 62 in the first position, brake cylinder pressure fills the reference chamber 74 to provide a target cylinder pressure that is used as a reference to determine when the drop in the actual cylinder pressure should be maintained by directing brake pipe to the brake cylinder. Thus, according to one aspect of the present invention, the target cylinder pressure is determined by using the maximum pressure that is developed for a given brake pipe reduction regardless of piston travel of the brake cylinder. The maximum cylinder pressure developed is used as the reference pressure to determine when brake pipe should be directed to cylinder. As noted above, the choke 84 prevents an erroneously high target pressure from being directed to the reference chamber 74 during initial brake cylinder pressure development. Further, the first check valve 62 will not move to the first position until the spring force of the check spring 78 is overcome. The first check valve 62 may open when the brake cylinder pressure increases above a predetermined value, such as 12 psi. The pressure in the reference chamber 74 will increase until the force generated from the check spring 78 and the pressure in the reference chamber 74 moves the first check valve 62 into the second position to isolate the brake cylinder passageway 18 from the reference chamber 74. Accordingly, brake cylinder pressure via the brake cylinder passageway 18 will act on the first side 70 of the diaphragm 66 and pressure within the reference chamber 74 corresponding to a target cylinder pressure will act on the second side 72 of the diaphragm 66.

Referring again to FIGS. 1-2, when leakage out of the brake cylinder exists, the pressure of the reference chamber 74 remains constant on the second side 72 of the diaphragm 66 while the brake cylinder pressure via the brake cylinder passageway 18 is reduced. The pressure differential causes the valve member 20 to move from the second position, shown in FIG. 2, to the first position, shown in FIG. 1, to place the brake pipe passageway 16 in fluid communication with the brake cylinder passageway 18 via the valve passageway 42. The amount of air from the brake pipe passageway 16 to the brake cylinder passageway 18 is determined by the amount of brake cylinder leakage. Further, the size of the first through hole 44 and the second through hole 46 may also act as a choke to control the rate at which brake pipe flows to the brake cylinder passageway 18. For service brake applications where there is no leakage out of the brake cylinder, the brake cylinder pressure is developed to within an acceptable tolerance of the target cylinder pressure, the valve member 20 moves the second position (FIG. 2) to isolate the brake pipe passageway 16 from the brake cylinder passageway 18. The backflow check valve 50 prevents brake cylinder air from feeding into the brake pipe passageway 16 in the event that brake pipe pressure becomes lower than brake cylinder pressure.

When the brake application is released, the brake cylinder passageway 18 is exhausted to atmosphere causing the second check valve 64 to move from the second position to the first position thereby exhausting the reference chamber 74 along with the brake cylinder passageway 18.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A quick service limiting valve comprising:
   a housing defining an interior chamber, a brake pipe passageway, and a brake cylinder passageway;
   a valve member received within the interior chamber of the housing, the valve member comprising a body, a first seal, a second seal, and a valve spring, the body of the valve member defining a valve passageway, the valve member having a first position where the valve passageway allows fluid communication between the brake pipe passageway and the brake cylinder passageway and a second position where the brake pipe passageway is isolated from the brake cylinder passageway, the valve spring biasing the valve member to the second position;

a follower assembly received within the interior chamber of the housing, the follower assembly comprising a body, a first check valve, a second check valve, a diaphragm, and a follower spring, the diaphragm having a first side in fluid communication with the brake cylinder passageway and a second side in fluid communication with a reference chamber, the first check valve having a first position where the brake cylinder passage is in fluid communication with the reference chamber and a second position where the brake cylinder passage is isolated from the reference chamber, the second check valve having a first position where the reference chamber is in fluid communication with the brake cylinder passageway and a second position where the reference chamber is isolated from the brake cylinder passageway, the follower spring biasing the valve member toward the first position, wherein the valve member is configured to move between the first position and the second position based on a pressure differential between a pressure of the brake cylinder passage and a pressure of the reference chamber.

2. The valve of claim 1, wherein the first check valve is a one-way check valve only allowing air flow into the reference chamber.

3. The valve of claim 2, wherein the first check valve comprises a check body and a check spring, the check spring biasing the first check valve to the second position into engagement with a seat defined by the body of the follower.

4. The valve of claim 2, wherein the second check valve is a one-way check valve only allowing air flow from the reference volume to the brake cylinder passageway.

5. The valve of claim 4, wherein the second check valve comprises an umbrella valve.

6. The valve of claim 1, wherein the valve member further comprises a backflow check valve configured to prevent flow from the brake cylinder passageway to the brake pipe passageway.

7. The valve of claim 6, wherein the backflow check valve is received within the valve passageway of the valve member, the back flow check valve comprising a spring seat, backflow spring, and a valve member.

8. The valve of claim 7, wherein the valve member of the backflow check valve is spherical.

9. The valve of claim 1, wherein the follower assembly comprises a choke positioned between the brake cylinder passageway and the first check valve.

10. The valve of claim 9, wherein the choke comprises a filter.

11. The valve of claim 1, wherein the housing and the second side of the diaphragm define the reference chamber.

12. The valve of claim 1, wherein the first and second seals of the valve member form a seal between the housing and the first and second seals.

13. The valve of claim 12, wherein the first and second seals are O-rings.

14. The valve of claim 13, wherein the first and second seals are secured to the valve member.

15. The valve of claim 1, wherein the valve passageway of the valve member comprises a central opening extending along a longitudinal axis of the body of the valve member and a first through hole extending in a radial direction relative to the longitudinal axis of the body of the valve member.

16. The valve of claim 15, wherein the valve passageway of the valve member further comprises a second through hole extending in a radial direction relative to the longitudinal axis of the body of the valve member, the second through hole axially spaced from the first through hole.

17. The valve of claim 15, wherein the first through hole of the valve passageway of the valve member is positioned between the first and second seals.

18. The valve of claim 17, wherein an opening of the brake pipe passageway is positioned between the first and second seals when the valve member is in the first position.

19. The valve of claim 16, wherein the first and second through holes of the valve passageway are configured to form a choke to restrict flow from the brake pipe passageway to the brake cylinder passageway when the valve member is in the first position.

20. The valve of claim 1, wherein the body of the follower assembly is secured to the diaphragm, and wherein the body of the follower assembly engages the valve member.

* * * * *